United States Patent [19]

Andreadakis

[11] Patent Number: 4,963,114

[45] Date of Patent: Oct. 16, 1990

[54] PROCESS FOR FABRICATION OF HIGH RESOLUTION FLAT PANEL PLASMA DISPLAYS

[75] Inventor: Nicholas C. Andreadakis, Readington Township, Hunterdon County, N.J.

[73] Assignee: Bell Communications Research, Inc., Livingston, N.J.

[21] Appl. No.: 377,486

[22] Filed: Jul. 10, 1989

Related U.S. Application Data

[63] Continuation-in-part of Ser. No. 125,398, Nov. 25, 1987, abandoned, which is a continuation-in-part of Ser. No. 914,775, Oct. 3, 1986, abandoned.

[51] Int. Cl.$^5$ .......................... H01J 9/20; H01J 61/62
[52] U.S. Cl. .......................................... 445/25; 65/31; 156/657
[58] Field of Search .................. 445/24, 25; 313/485, 313/584, 587, 484; 156/655, 656, 657; 65/31

[56] References Cited

U.S. PATENT DOCUMENTS

| | | | |
|---|---|---|---|
| 1,861,577 | 6/1932 | Mattman | 156/663 |
| 3,755,027 | 8/1973 | Gilsing | 313/584 |
| 3,896,327 | 7/1975 | Schermerhorn | 313/485 |
| 3,916,393 | 10/1975 | Criscimagna et al. | 313/587 |
| 3,925,703 | 12/1975 | Schermerhorn | 313/587 |
| 4,011,071 | 3/1977 | Siegmand | 65/31 |
| 4,320,418 | 3/1982 | Pavliscak | 313/584 |
| 4,439,270 | 3/1984 | Powell et al. | 156/663 |

FOREIGN PATENT DOCUMENTS 141616  9/1982  Japan .................................. 156/629

OTHER PUBLICATIONS

Kern Thin/film Processes Academic Press, New York, NY 1978 pp. 435-436.
Hackh's Chemical Dictionary McGraw Hill, New York, NY 1969 p. 298 "Glass".

Primary Examiner—Kenneth J. Ramsey
Attorney, Agent, or Firm—James W. Falk

[57] ABSTRACT

A method of fabricating a display panel on a substrate material of soda-lime float glass. A dielectric layer composed of a mixture of lead, silicon and aluminum is deposited on the substrate to a thickness of from 25 to 150 microns. A masking pattern is defined on the surface of the dielectric layer where plasma display cavities are to be formed. Openings are etched in the dielectric layer with fluoboric acid to geometries no larger than approximately 0.15 mm wide by 0.15 mm thick at regions defined by the masking pattern, the openings extending to the major surface of the substrate and forming a plasma display cavity. A cover is provided over the cavity to form an enclosed envelope containing a noble gas. A phosphor is provided in the plasma display cavity together with electrodes adjacent to the cavity for ionizing the gas and exciting the phosphor.

7 Claims, 2 Drawing Sheets

PROCESS FOR FABRICATION OF HIGH RESOLUTION FLAT PANEL PLASMA DISPLAYS

REFERENCE TO RELATED APPLICATION

This is a continuation-in-part of U.S. Patent Application Ser. No. 125,398, filed Nov. 25, 1987, which is a continuation-in-part of U.S. Patent Application Ser. No. 914,775, filed Oct. 3, 1986, now abandoned.

BACKGROUND OF THE INVENTION

1. Field of the Invention

The present invention relates to methods for fabricating a flat panel plasma display and more particularly to methods for fabricating gas plasma display panels with high resolution monolithic structures using thick film process technology.

2. Description of the Prior Art

The UV-excited phosphor plasma display is a promising technology for large-area high-resolution color displays. However, current thick-film technology is a major limiting factor in color display device size and resolution, since it cannot provide long barriers with the density and cross-sections required. Specifically, materials and processing techniques known in the prior art do not make possible the fabrication of long dielectric barriers 0.025 mm wide and 0.025 mm high for full-color plasma displays with increased resolution.

In the prior art, display panels employing gas discharge are well known and a variety of such display panels are commercially available. A typical structure of a gas display panel utilizes a substrate with an array of electrodes and a dielectric layer thereon, and a cover, which may also include a dielectric layer, placed so as to define a gap therebetween. A gas which is capable of being ionized, such as neon with 0.1 percent argon added, is sealed within the gap. The display is defined by locally induced glow discharges in the gas produced by applying a desired potential to selected electrodes in arrays embedded in the dielectric layers.

In one form of plasma display panel, known as the "twin-substrate" design, a first array of parallel electrodes is embedded in the dielectric on the substrate, and a second array is embedded in the dielectric on the cover in a direction orthogonal to the first array so as to define display sites at the crosspoints of the two arrays.

Since the late 1960s, when flat panel display R&D began to flourish, the interest in non-interfering precision spacers has expanded. Such spacers can be fabricated in a number of ways, either as self-supported structures or as deposited patterns, primarily via thick-film application. Screen-printing is the most widely used method of thick-film patterning to date, and it is widely agreed that it is not easy to print 0.125 mm lines or 0.200 mm vias; the fine line screening limit for thick-film materials is 0.125 mm wide by 0.025 mm thick at best.

Although it has been possible to generate 0.150 mm wide by 0.100 mm thick layers of thick-film dielectric barrier and cell structures via multiple screening techniques, the uniformities obtained have generally been unsatisfactory, the process costly and there are density and substrate size limitations.

As display sizes increase and pixel dimensions decrease, it becomes clear that screened thick-film patterns are not able to satisfy the display spacer needs for most applications. Display researchers, who daily address the problems associated with high resolution displays, have been investigating other spacer approaches. They have resorted to a number of techniques such as chemically etched thin silicate glass sheets, drilled mica, other self-supported structures, or to mechanically-grooved dielectric geometries on the substrate. Prior to the present invention, all of these approaches have not proven useful in providing accurately positioned geometries on very tight centers.

SUMMARY OF THE INVENTION

Briefly, and in general terms, the present invention provides a method of fabricating a display panel starting with a substrate selected from the group consisting of soda-lime float glass, alumina glass, or suitable metal substrates with compatible thermal expansion coefficients, such as a nickel-iron alloy. A lead-containing dielectric layer is deposited on the substrate and a masking pattern defined on the surface of the dielectric layer where display elements are to be formed. Openings are etched in the dielectric layer with fluoboric acid at regions defined by the pattern, the openings extending to the major surface of said substrate. A cover containing a phosphor is provided over the substrate, and a noble gas is provided in the cavity formed by the openings in the dielectric layer. Electrodes are also provided in the cover for selectively ionizing the noble gas in certain cavities and exciting the phosphor, thereby resulting in light emission.

In accordance with a specific illustrative embodiment of the present invention, the substrate comprises a lead-free silicate glass. The substrate, including any conductive lines that may be present thereon, is relatively etch-resistant to fluoboric acid. By contrast, the lead-containing dielectric layer is relatively easily etched by the fluoboric acid.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

DESCRIPTION OF THE PREFERRED EMBODIMENT

Figure 1:
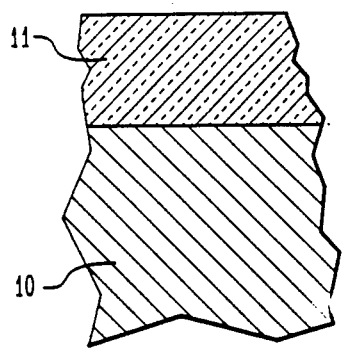
FIG. 1 is a highly simplified cross-sectional view of the substrate portion of a thick film flat panel display device during the first step in processing according to the present invention.

The present invention provides a thick-film dielectric processing technique utilizing specific materials which permit the fabrication of substrates with high density geometries (from 0.15 mm wide by 0.15 mm thick down to 0.025 mm cross-sections), and the utilization of such substrates with phosphor and excitation structures for plasma display panel applications.

It is known in the prior art that thin sheets of clear glass (to 0.150 mm thick) or special photosensitive glass compositions have been patterned with intricate thru-hole and other half-etched line geometries. Mechanically or laser-drilled mica sheets (down to 0.150 mm thick) have also provided high density through geometries for small or large area structures. The major drawback of these approaches are cost and handling problems, minimum thickness and size limitations for thin glass, hermeticity, pattern edge definitions and cleaning for mica sheets. In addition, the degree of difficulty to maintain the correct alignment between these free-standing sheets and the remaining device features increases linearly with the device area.

It is also known in the prior art that mechanically-grooved geometries formed on substrates can be fabricated over large areas. Placement and depth accuracies can be maintained within 0.05 mm, with moderate care in equipment selection, cutting wheel and arbor preparation and process set-up. Depending on the type of substrate, the pitch, depth and width of cut, it is possible to achieve very high density geometries with this approach. However, because of the processes involved, the prior art techniques can only be used in special applications and primarily in cases where patterning is required in the beginning of the process. Only line patterns are achievable with prior art techniques and the depth accuracy of shallow grooves is extremely poor.

Various types of flat panel displays, especially those in which electronic cost reduction schemes are being implemented, require dielectric spacers not merely for the purpose of maintaining a uniform spacing between the two flat substrates but, in addition, to be used as physical barriers which provide spatial selection and define individual cells of the display device.

Although some of the approaches described above may be used for low density structures, as the resolution and size requirements are increased, none of them can satisfy these needs adequately. The severity of these requirements becomes extreme in full-color plasma displays where ultraviolet plasma is used to selectively excite phosphor dots located in close proximity to each other. Under these conditions, the object of crosstalk elimination is considerably more complex.

Specifically, the exciting radiation has to be contained only in the sites to be addressed. This task is preferably achieved with the use of physical barriers. Another requirement is that emitted radiation from the discharge at each selected site cannot be permitted to penetrate into adjacent unselected sites and result in excitation of the phosphor within those sites and, thus, in uncontrolled color-mixing. This problem can be remedied with the use of optically opaque barriers. Since at least three different color sites (R, G, B) are needed for full-color production, and display quality depends on the proximity of the various color sites within a single pixel, the pitch of full-color devices needs to be much smaller than that of equivalent monochrome ones. Consequently, it can be expected that most of the simple barrier approaches considered for monochrome devices cannot address adequately these needs.

The present invention provides a thick-film processing approach which permits the fabrication of a plasma display substrate with high-density geometries using thick-film dielectrics (from 0.15 mm wide by 0.15 mm thick down to 0.025 mm cross-sections) on glass or other substrates.

In the present invention, soda-lime float glass is preferably used as the prime vehicle for the main reason that it is the standard substrate material for plasma displays and thus a large family of compatible commercial thick-film dielectric and conductive materials is readily available. However, the use of other substrate materials is within the scope of the present invention.

Several commercially available Ni-Fe alloys, which are compatible with soda-lime glass and have been sealed successfully in glass envelopes, may also be used as substrates; Allegheny No. 4750 and Sylvania No. 4 alloys are two such materials.

In addition to the substrate, the present invention also specifies the use of a specific thick film dielectric which is applied over the substrate. Table I lists the commercial thick-film dielectrics used which are within the scope of the present invention. In general terms the dielectric is a mixture of lead, silicon, and aluminum in various proportions.

TABLE 1

| COMMERCIAL DIELECTRICS | BARRIER SAFE TEMP. °C. | MAIN CONSTITUENTS (ELEMENTS) | OPTICAL CHAR. |
|---|---|---|---|
| Cermalloy 9000 | 500 | Pb, Si, Al, Ca | Clear |
| Corning 7575 | 460 | Pb, Si, Al, Na | Opaque |
| ESL 4014C | 440 | Pb, Si, Al, Na | Clear |
| Owens-Illinois CV-455 | 460 | Pb, Si, Al, Na | Opaque |

These represent only a small fraction of the available materials which can be used and are within the scope of the present invention. The common factor of these dielectrics is their compatibility with soda-lime glass in expansion coefficient and processing temperatures, as well as their suitability for plasma display fabrication.

Most of these glasses are vitreous within the chosen temperature range, whereas Corning 7575, Owens-Illinois CV-455 and Transene TGC-20 are devitrifying materials and thus, if properly fired initially, they may be reprocessed at elevated temperatures after patterning, without any significant reflow.

More specifically, with reference to the drawing, the fabrication technique according to the present invention can be illustrated. The fabrication of a display panel begins with fabrication of a clean, uniformly thick coating of a suitable dielectric 11 over the soda-lime glass (or equivalent) substrate 10. Uniform layers of thick-film dielectric may be applied to essentially any clean, flat surface via screening, doctor-blading, roller-coating, spraying, electrophoretic deposition or a combination of any of the above, as shown in FIG. 1.

Figure 2:
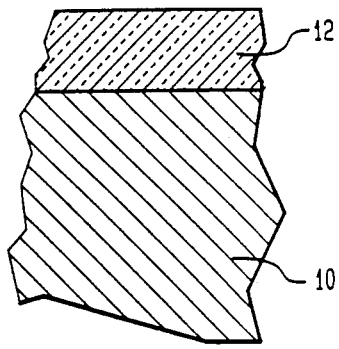
FIG. 2 is a highly simplified cross-sectional view of the substrate during a second step in processing according to the present invention.

Turning next to FIG. 2, the dielectric coating obtained through any of these means is first oven-dried at about 100° C. for the removal of volatile solvents. Subsequently, it is subjected in a high temperature furnace to a reflow firing profile suitable for the removal of the organic binder system used in the preparation of the thick film ink, the reflow characteristics of the thick film particles and appropriate for the substrate itself, leaving a residue 12 over the substrate 10.

The dielectric may be prepared into a screening paste of 100,000 to 500,000 centipoise with 2 to 25 micron size particles and screened through a 105 to 400 mesh stainless steel screen as required for achieving the desirable fired coating thickness. Dielectric thickness of 25 to 150 microns may be generated with one to four such screening-and-firing sequences.

Single coatings of thick layers may be obtained with a rectangular stainless steel blade having one long flat edge cut at 45 degrees, which glides over edge-mounted precision stainless steel shims or a perimeter-supported stencil. By the appropriate choice of shim thickness, a variety of coating heights may be achieved. Since this process can produce very thick single layers of wet coatings, the drying procedure becomes very critical. Fast drying generally results in crust-forming, cracking and material built-up at the perimeter. Thus, it has been necessary to adjust the drying temperatures and times for various wet thicknesses. It has been found that good results can be obtained for wet thicknesses up to 400 microns in a convection dryer set at 65° C.

The roller coating approach is ideal for large volume application of relatively thick unpatterned layers of dielectric paste on small or large substrates. Various types of roller configurations and materials are available for use with a number of equipments. Again, as described above, material characteristics and coating thickness have a bearing on the drying and firing parameter. Multiple applications are possible with intermediate dryings and firings.

Another method of dielectric deposition is by spraying. Spraying, which includes electrostatic and flame spraying, can produce a wide range of coated thicknesses of thick-film materials. In most cases, the problems associated with the drying of volatile solvents are minimal but thickness uniformity control is more difficult.

Still another method of dielectric deposition is by electrophoretic deposition. Large numbers of conductive substrates or coatings may be coated with very uniform layers of dielectric "thick-film" suspensions and a wide range of thicknesses can be achieved in this manner. This type of deposition is widely used in the production of enamel steels and various decorative coatings.

Figure 3:
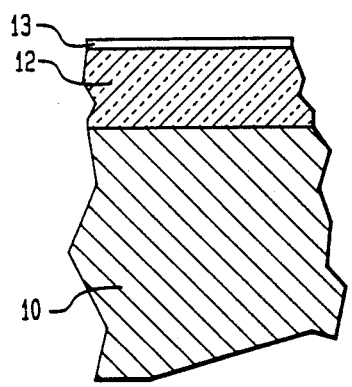
FIG. 3 is a highly simplified cross-sectional view of the substrate during a third step in processing according to the present invention.

Turning next to FIG. 3, the reflowed thick film dielectric 12 is overcoated with liquid or dry film photoresist 13. Liquid positive photoresist (2 to 3 microns) has been applied via dipping or roller coating. Dry-film photoresist has been used primarily on textured surfaces or whenever spray etching is considered in conjunction with very thick coatings for good width and vertical edge control.

Figure 4:
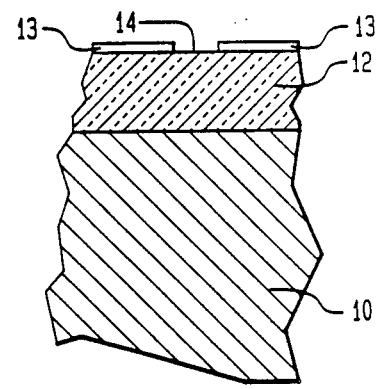
FIG. 4 is a highly simplified cross-sectional view of the substrate during a fourth step in processing according to the present invention.

Turning next to FIG. 4, photo-patterning to form aperture 14 in the photoresist layer 13 may be obtained with a UV-exposure unit having good intensity uniformity and provisions for heat removal from the artwork areas. Whenever precise alignment to preexisting geometries is needed, appropriate fixturing is provided. In addition, in the event that the substrate already carries other planar patterns, proper choice of alignment marks for all of the artworks involved must be made in advance and in such a way that opacity of the materials used, alignment procedures and fixtures and etch protection of coatings do not make subsequent processing steps impractical.

Figure 5:
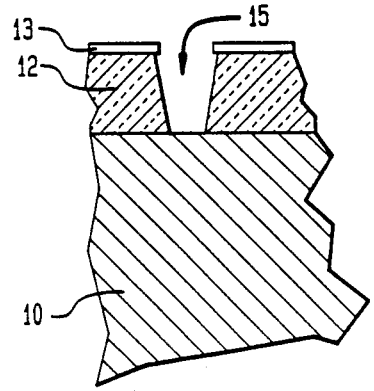
FIG. 5 is a highly simplified cross-sectional view of the substrate during a fifth step in processing according to the present invention.

FIG. 5 shows a cavity 15. The photoprocessed substrate may be etched either in a still bath or in a spray etcher with vertical or horizontal spray capabilities. Still bath etching (20° C. to 50° C.) is only advisable for small substrates with thin layers of coated material and for use with rapid attack etchants. However, as the substrate size and the intricacy of the pattern increase, the results obtained in a spray-etcher are far superior.

Various acids known to attack lead-based glasses may be used with different dielectrics which belong to a large family of materials suitable for plasma display fabrication. Fluoboric acid ($HBF_4$) is the etchant which has been found to lead to the extremely fine resolution of the present invention.

Room temperature spray etching (22° C. to 25° C.) has been found to work quite satisfactorily. Spray etching at elevated temperatures with these etchants has the distinct disadvantage of rapid deterioration of the acid as a result of increased fuming and loss through the exhaust system.

In accordance with the principles of the present invention, the lead-containing dielectric layer 11 is patterned by lithographic techniques to achieve a dense geometry of microminiature holes over a relatively large area. In accordance with the invention, fluoboric acid has been determined to be a particularly effective etchant for producing a high-resolution pattern of holes in the lead-containing layer 11. Additionally, in further accordance with the invention, it has also been determined that a substrate made, for example, of a lead-free silicate glass such as soda-lime glass is relatively etch-resistant to fluoboric acid. Any thin film conductive lines that may be present on the substrate 10 are also typically etch-resistant to the fluoboric acid.

As a result of the etch selectivity discovered to exist between the lead-containing layer 11 and the soda-lime substrate 10, etching of the layer 11 with fluoboric acid can be allowed to extend all the way through the layer 11 to the top surface of the substrate 10. This facilitates realization of substantially identical display cells and avoids the risk of any appreciate damage to the surface of the substrate. There is thus no need to try to control the etching of the layer 11 to stop just as the top surface of the substrate is reached or to interpose an etch-barrier layer between the layer 11 and the substrate 10.

Figure 6:
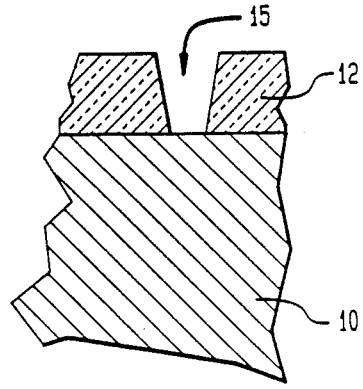
FIG. 6 is a highly simplified cross-sectional view of the substrate during a sixth step in processing according to the present invention.

Turning next to FIG. 6, after the etched parts have been thoroughly rinsed, the photoresist 13 is removed with the use of the appropriate resist stripper. Following final rinse and drying of the surface, the edges of the etched high density geometries will be found to contain large amounts of particulate residue, which must be removed. Very good results are obtained with the use of an ultrasonic cleaner which is able to remove all loose residue and clean the part without damaging any of the generated fine line structures formed from the cavity 15.

The arrangement of electrodes on the substrate is not shown in the cross-sectional views of the portion of the display panel shown in FIG. 1–6, nor is the method of deposition described here, since such technology is known to those skilled in the art of plasma display technology.

Figure 7:
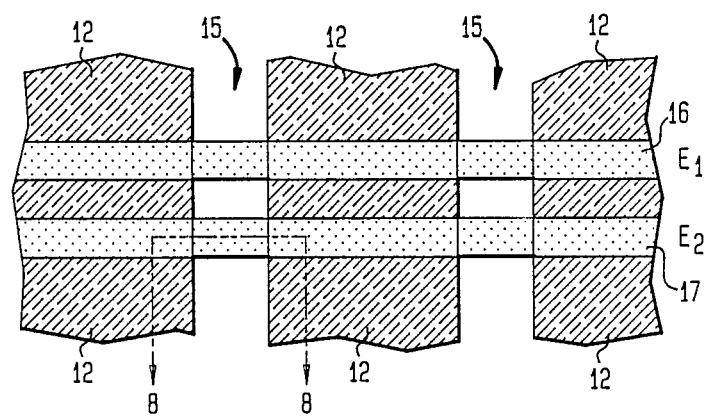
FIG. 7 is a top plan view of a portion of a typical display device fabricated according to the present invention including both the substrate and the top cover portions.
Figure 8:
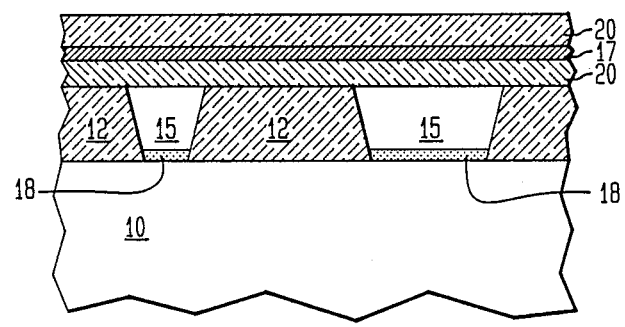
FIG. 8 is a cross-sectional view of the display device shown in FIG. 7.

FIG. 7 is a top plan view of a highly simplified assembled plasma display device in which a top cover plate containing electrodes $E_1$ and $E_2$ is sealed together with the substrate formed using the etching technique of the present invention. FIG. 8 is a cross-sectional view of the plasma display device shown in FIG. 7 through the dotted lined portion shown in FIG. 7, more explicitly showing the top cover plate 20.

FIG. 8 also shows the cavities 15 which now form an enclosed envelope. A noble gas, with efficient vacuum ultraviolet emission for phosphor excitation, such as helium mixed with xenon, is provided in the cavities 15 for ionization. A phosphor 18 is provided on the surface of the substrate 10 in the bottom of each of the cavities 15 and on the sidewalls of the cavities 15 so that when the noble gas is ionized by a potential on the electrodes 16 and 17, the phosphor 18 is excited and light emission occurs.

By the use of the invention, wall cross sections of 25 by 25 microns may be obtained on long lines and 50 by 50 microns on high density crossovers and display cell structures formed by individual cavities 15 with a good aspect ratio.

Although no effort has been made to establish the minimum width limit, it has been observed that reduction of the surface contact area below widths of 25 microns will weaken the bond between substrate and reflowed overcoating, and any mechanical or thermal mismatches between the two may result in fracture or delamination.

Since the structure of most plasma displays requires the use of at least one set of glass-coated (ac) electrodes, there are two approaches for the generation of barrier geometries over the main dielectric used in the display active area:

1. The barriers may be generated first directly over the conductor pattern, and the display dielectric subsequently deposited over the entire surface of the substrate. A meniscus results at the barrier-to-glass interface, and its size depends on the final thickness of the display dielectric.

2. The barrier dielectric layer is deposited over the prefired display dielectric coating and then it is patterned per the procedure described above. It has been found that this sequence of steps can result in good barrier structures and satisfactory display cell dielectric as long as the proper materials and thermal cyclings are chosen for each of the multilayer coatings; no reflow of the display cell dielectric is permitted during the firing of the barrier layers; and the choice of the display dielectric is such that it is either very slow reacting or completely impervious to the attack of the etchant used in the barrier fabrication.

Finally, since contrast enhancement with minimal loss in output is a goal of all visual displays, there is also a question of black dielectric barrier materials suitable for patterning.

Two methods of incorporating such thick-film compositions may be used, one of a full-thickness dark barrier and the other of a thick black coating which is patterned at the same time with the main barrier structure.

Dielectric spacer and barrier structures with cross sections down to 0.25 mm have been successfully fabricated by the photopatterning and chemical etching of thick-film dielectrics on various substrate materials.

The present invention employs substrates, thick-film materials and etchants, primarily for use in flat display devices. High resolution barrier structures directly on glass substrates are invaluable in the fabrication of advanced type flat displays. However, similar structures on metal substrates, because of their potential usefulness in displays where thin multilayer assemblies of patterned glass are electrodes, can also be used.

The fact that the dielectrics used can be fired before patterning without concern that a full reflow thermal cycle may cause deformation of any geometries, allows the generation of nonporous and fully hermetic structures, free of contamination potential during subsequent processing and free of virtual leaks during display operation.

Since this technique uses a substrate means to achieve the desired geometries, it becomes obvious that the greater the pattern density, the more attractive this approach becomes.

While the invention has been illustrated and described as embodied in thick film processing techniques for flat panel displays, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that from the standpoint of prior art, fairly constitutes essential characteristics of the generic or specific aspects of this invention, and, therefore, such adaptations should and are intended to be comprehended within the meaning and range of equivalence of the following claims.

What is claimed is:

1. A method of fabricating a display panel comprising the steps of forming a substrate comprising a lead-free silicate glass, depositing a lead-containing dielectric layer on the top surface of said substrate, establishing a masking pattern on the top surface of said dielectric layer to delineate an array of regions in which plasma display cavities are to be formed, etching cavities in said dielectric layer with fluoboric acid in the regions delineated by said pattern, which acid is relatively effective to etch said lead-containing dielectric layer and relatively ineffective to etch the surface of said lead-free substrate, whereby said cavities are etched through the entire thickness of said dielectric layer to the top surface of said substrate without causing any substantial etching of the surface of said substrate, providing a cover over said cavities to form an enclosed display panel adapted to contain ionizable gas in said cavities, and providing an array of electrodes adjacent said cavities for ionizing the gas in selected ones of said cavities.

2. A method as in claim 1 wherein said masking pattern is established by photolithographic techniques to delineate a high-resolution array of regions over a relatively large area.

3. A method as in claim 2 wherein said substrate comprises soda-lime glass.

4. A method as in claim 3 where a phosphor is deposited on the top surface of said substrate within each of said cavities.

5. A method as in claim 4 wherein said dielectric layer is etched with fluoboric acid at room temperature.

6. A method as in claim 5 wherein said ionizable gas comprises a mixture of helium and xenon.

7. A method as in claim 6 wherein the thickness of said dielectric layer is approximately 25 to 150 micrometers.

* * * * *